(12) United States Patent
Reiter

(10) Patent No.: US 12,510,577 B2
(45) Date of Patent: Dec. 30, 2025

(54) TESTING SYSTEM AND METHOD FOR TESTING DEVICES UNDER TEST

(71) Applicant: Rohde & Schwarz GmbH & Co. KG, Munich (DE)

(72) Inventor: Samuel Reiter, Dallas, TX (US)

(73) Assignee: Rohde & Schwarz GmbH & Co. KG, Munich (DE)

( * ) Notice: Subject to any disclaimer, the term of this patent is extended or adjusted under 35 U.S.C. 154(b) by 506 days.

(21) Appl. No.: 18/076,528

(22) Filed: Dec. 7, 2022

(65) Prior Publication Data

US 2024/0192258 A1  Jun. 13, 2024

(51) Int. Cl.
*G01R 29/08* (2006.01)

(52) U.S. Cl.
CPC ..... *G01R 29/0871* (2013.01); *G01R 29/0878* (2013.01)

(58) Field of Classification Search
None
See application file for complete search history.

(56) References Cited

U.S. PATENT DOCUMENTS

| | | | |
|---|---|---|---|
| 2020/0007245 A1* | 1/2020 | Abadie | G01R 29/105 |
| 2021/0302484 A1 | 9/2021 | Rowell | |
| 2021/0318369 A1* | 10/2021 | Rehammar | H01Q 3/02 |
| 2021/0341528 A1* | 11/2021 | Sanchez Hernandez | H01Q 1/38 |
| 2022/0393753 A1* | 12/2022 | Nakayama | H04B 7/0617 |

* cited by examiner

*Primary Examiner* — Idowu O Osifade
(74) *Attorney, Agent, or Firm* — Westman, Champlin & Koehler, P.A.

(57) ABSTRACT

A testing system for testing a device under test comprises a test chamber with a test location for receiving the device under test. The testing system further comprises at least one first antenna with a corresponding reflector. The at least one first antenna is configured to transmit and/or receive an electromagnetic signal along an indirect beam path. The indirect beam path extends between said at least one first antenna and the device under test via the corresponding reflector. The testing system further comprises at least one second antenna configured to transmit and/or receive an electromagnetic signal along a direct beam path extending between said at least one second antenna and the device under test. The at least one first antenna and the corresponding reflector are arranged to provide a quiet zone at the test location. The at least one reflector can be rotated in a horizontal plane.

15 Claims, 9 Drawing Sheets

TESTING SYSTEM AND METHOD FOR TESTING DEVICES UNDER TEST

TECHNICAL FIELD

The present invention relates to a testing system for testing a device under test. The invention further relates to a method for testing devices under test.

BACKGROUND OF THE INVENTION

Testing systems for testing devices under test are known, e.g. for measuring characteristics of user devices for mobile communication. The device under test is located in a shielded chamber of the testing system and one or more antennas inside the chamber are used to measure over-the-air characteristics (OTA characteristics) of the device under test. The antennas can be located in the far-field of the device under test in order to determine far-field characteristics of the device under test.

Reflectors can be arranged between the antennas and the device under test. US 2021/0302484 A1 relates to a measurement system for testing a device under test over the air which comprises signal generation and/or analysis equipment, several antennas, several reflectors and a test location for the device under test. At least two of the several antennas are located within a main plane, whereas at least one of the several antennas is located in an auxiliary plane that is offset with respect to the main plane.

Often, different devices under test must be analyzed which can differ in the location or orientation of the antennas. Therefore, if a device under test is fixedly arranged inside the test chamber, the location of the antennas which transmit or receive electromagnetic signals depends on the type of the device under test. For example, different smartphones can have antennas arranged in locations in a side region which differ by several centimeters. This can require elaborate rearrangements of the measurement antennas inside the chamber or of the mount of the device under test within the chamber.

Therefore, an underlying problem of the present invention is how to provide a testing system which can easily be adapted to different devices under test.

SUMMARY OF THE INVENTION

The present invention solves this problem by a testing device and a method for testing devices under test having the features of the independent claims. Further advantageous embodiments are subject matter of the dependent claims.

According to a first aspect, a testing system for testing a device under test is provided. The testing system comprises a test chamber with a test location for receiving the device under test. The testing system further comprises at least one first antenna with a corresponding reflector. The at least one first antenna is configured to transmit and/or receive an electromagnetic signal along an indirect beam path. The indirect beam path extends between said at least one first antenna and the device under test via the corresponding reflector. The testing system further comprises at least one second antenna configured to transmit and/or receive an electromagnetic signal along a direct beam path extending between said at least one second antenna and the device under test. The at least one first antenna with the corresponding reflector are arranged to provide a quiet zone at the test location. The at least one reflector can be rotated in a horizontal plane.

According to a second aspect, a method for testing devices under test is provided. A first device under test is arranged at the test location of the testing system according to the first aspect. A first measurement is performed on the first device under test. The first device under test is replaced by a second device under test. The at least one reflector is rotated in the horizontal plane to bring the at least one reflector into a new orientation. A second measurement is performed on the second device under test.

The invention proposes to perform indirect measurements on the device under test with the at least one first antenna, having a reflector which is horizontally rotatable, i.e. around a respective vertical axis. Herein, the test chamber defines the horizontal plane or vertical axis, respectively.

If different devices under test are tested, the location of the antennas of the device under test may change. The different locations can easily be compensated for by horizontally rotating the at least one reflector. Therefore, the flexibility of the testing system for devices under test having different antenna configurations significantly increases. The time and effort required for setting up the testing system for different devices is greatly reduced.

The invention proposes to compensate for different antenna configurations at the level of the reflectors. That is, there is no need to adjust the position of the device under test (e.g. by repositioning and/or tilting the device under test) to bring the antennas always in the same position. Rotating the reflector can be more reliable as compared with the re-arrangement of the device under test. That is, no device-specific positioning of the mount for holding the device under test is required.

In this specification, a quiet zone may relate to a volume in which the device under test is exposed to electromagnetic waves with essentially uniform amplitude and phase. Small deviations from this ideal situation may be allowed.

According to an embodiment of the testing system according to the first aspect, the at least one first antenna and the corresponding reflector are arranged along a respective vertical axis. That is, the at least one first antenna can be located directly above the corresponding reflector. This utilizes the vertical space of the chamber rather than increasing the footprint of the testing device.

According to an embodiment of the testing system according to the first aspect, the reflector reflects the electromagnetic signal essentially under an angle of 90 degrees. Thus, the electromagnetic signal can for example be directed towards the side regions of the device under test, e.g. a side region of a smartphone comprising the antennas.

According to an embodiment of the testing system according to the first aspect, the at least one reflector comprises a surface with a parabolic shape, in particular a concave parabolic shape. Preferably, the at least one first antenna can emit electromagnetic radiation which is reflected from the corresponding reflector and arrives at the quiet zone within the test location as an essentially plane wave. The size of the quiet zone increases because of the parabolic shape.

According to an embodiment of the testing system according to the first aspect, the testing system is configured to test a device under test having a plurality of antennas, wherein the first antennas and the first antennas of the device under test are in a one-to-one correspondence. That is, exactly one of the first antennas corresponds to each of the antennas of the device under test. Each first antenna may be configured to emit the electromagnetic signal to or receive the electromagnetic signal from the corresponding antenna of the device under test.

According to an embodiment of the testing system according to the first aspect, a surface roughness of a reflecting surface of the at least one reflector is low, e.g. in the nanometer regime. For example, the surface roughness can be smaller than 10 nanometers (root mean square), preferably smaller than 5 nanometers, 2 nanometers of 1 nanometers. The low surface roughness improves the reflection properties of the reflector.

According to an embodiment of the testing system according to the first aspect, the at least one reflector has rolled and/or serrated edges. The shape of the edges of the reflective also improve the reflection properties of the reflector.

According to an embodiment of the testing system according to the first aspect, the at least one first antenna and the corresponding reflector are located with respect to the test location in such a way that said first antenna is configured to transmit the electromagnetic signal to and/or receive the electromagnetic signal from an antenna of the device under test in a side region of the device under test. For example, the reflectors can only be used for these side antennas of the device under test, i.e., for electromagnetic radiation emitted within a plane defined by the device under test. For example, the at least one second antenna can be used for direct measurement of the electromagnetic signals in a direction perpendicular to a plane defined by the device under test.

According to an embodiment, the testing system according to the first aspect further comprises a signal analyzer configured to determine a beam of a plurality of beams of the device under test based on a rotation angle of the at least one reflector. Each different beam of the plurality of beams may correspond to a specific rotation angle or range of rotation angles.

According to an embodiment of the testing system according to the first aspect, the at least one reflector is configured to be manually rotated, e.g. using a rotary knob or the like.

According to an embodiment of the testing system according to the first aspect, the at least one reflector is configured to be automatically rotated, e.g. with a motor of the measurement system. A user may control the motor of the testing system over a user interface of the testing system and may therefore adjust the rotation angle.

According to an embodiment of the testing system according to the first aspect, the rotation angle of each reflector can be adjusted separately. In other embodiments, all rotation angles are simultaneously adjusted.

According to an embodiment of the testing system according to the first aspect, different rotation angles are preprogrammed, e.g. rotation angles corresponding to different devices under test. The user may select one of the rotation angles over a user interface. The user may also store different rotation angles in a memory of the testing system. The user may easily control the at least one reflector to be rotated by the stored rotation angle at a later time. For example, the user may store corresponding rotation angles for each of a plurality of different devices under test which may differ by their antenna configuration.

According to an embodiment of the testing system according to the first aspect, a phase center of the at least one first antenna is located at a focal point of the corresponding reflector. In this way, the quiet zone can be provided within the test location because the electromagnetic signal is essentially a plane wave in the quiet zone.

According to an embodiment, the testing system according to the first aspect further comprises at least one reflector mount for mounting the at least one reflector. The reflector mount is attached to a chamber wall of the test chamber, by attaching the reflector to the chamber wall, the position and orientation of the device under test is more robust against external disturbances.

According to an embodiment of the testing system according to the first aspect, the at least one first antenna and the at least one second antenna are arranged in a same plane.

According to an embodiment of the testing system according to the first aspect, propagation angles of the at least one first antenna and the at least one second antenna are substantially identical. For example, the propagation angles are essentially such that the electromagnetic signals are transmitted to or received from the at least one first antenna and at least one second antenna along a vertical axis.

According to an embodiment of the testing system according to the first aspect, the quiet zone is brought from a first region of the test location to a second region of the test location by rotating the at least one reflector. For example, different devices under tests have different antenna locations. The quiet zone can always comprise or overlap with the antenna location by a rotating the at least one reflector.

According to an embodiment, the testing system according to the first aspect comprises a device under test mount for receiving the device under test in a fixed position. In other words, the location or orientation of the device under test is not changed. Adjusting for different antenna configurations is performed solely based on the orientation (rotation angle) of the at least one reflector.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

Figure 1:
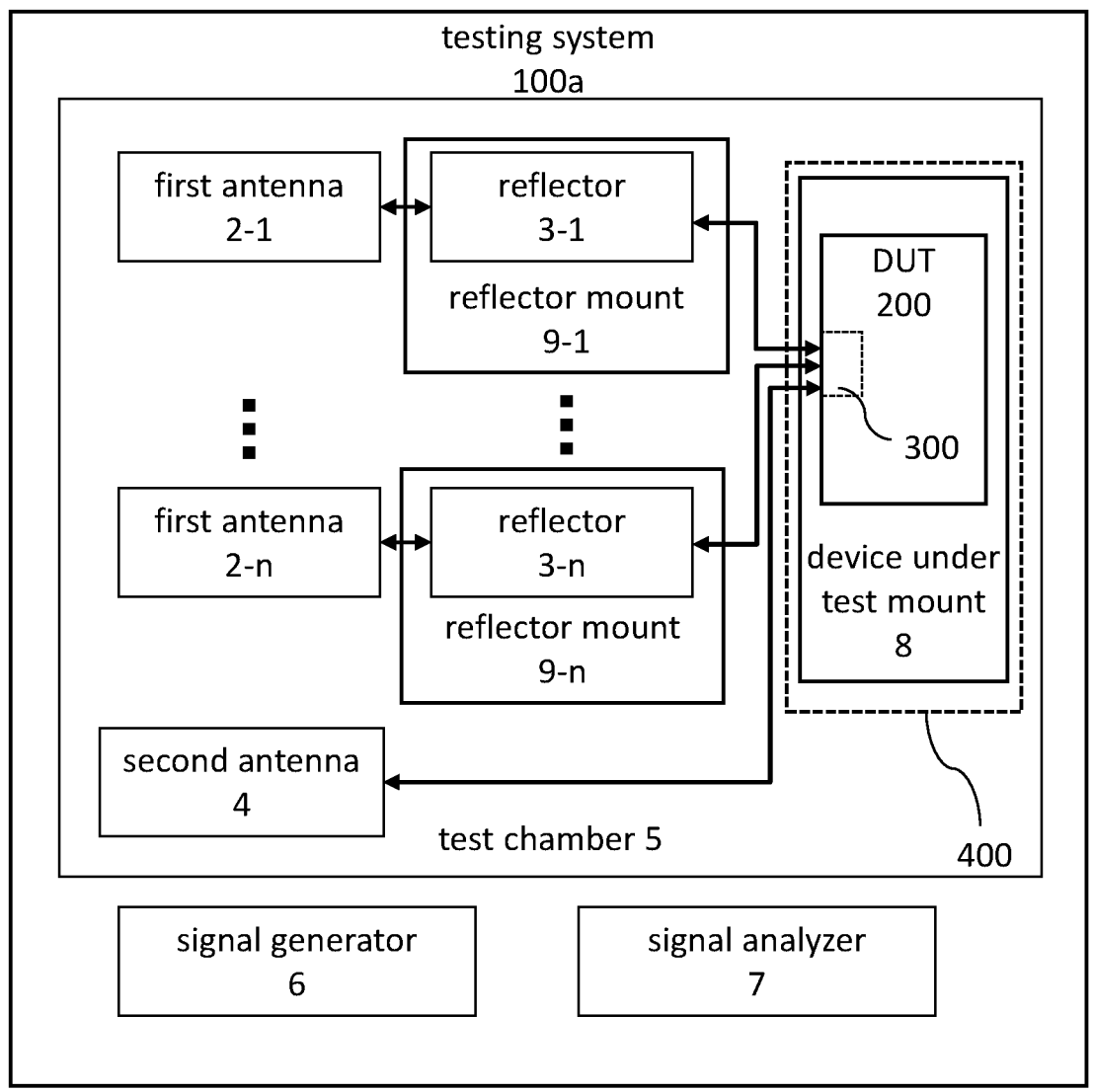
FIG. 1 shows a schematic block diagram of a testing system according to an embodiment of the invention.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated other-wise.

DETAILED DESCRIPTION OF THE DRAWINGS

FIG. 1 shows a schematic block diagram of a testing system 100a. The testing system 100a can be used for compact antenna test range (CATR) applications for testing a device under test 200, e.g. in the millimeter wave (mmW) range (between 30 GHz and 300 GHz) or at even higher frequencies. In an embodiment, the testing system 100a is used in a frequency range of 18 to 87 GHz. The used wavelength can comprise the frequency range FR 2 of the 5G standard, including frequency bands from 24.25 GHz to 52.6 GHz.

The testing system 100a comprises an anechoic test chamber 5, i.e. a chamber which is shielded against external influences. The walls within the test chamber 5 may comprise absorbing elements for absorbing electromagnetic radiation incident on the walls. Ideally, only the characteristics of the device under test 200 are measured and effects from reflections are suppressed. The test chamber 5 may further comprise wheels for moving the test chamber 5 to another location.

The device under test 200 may comprise one or more antennas. In particular, the device under test may comprise a multiple-input multiple-output (MIMO) antenna arrangement. The device under test 200 can be a user device, such as a smartphone, tablet, wearable, or the like. The device under test 200 may comprise a printed circuit board comprising a plurality of electronic components, e.g. discrete components such as coils or capacitors as well as integrated components such as microprocessors or the like.

The device under test 200 is located at a test location 400 inside the test chamber 5. The device under test 200 may be fixedly mounted in a device under test mount or holder 8 at the test location 400. The device under test mount 8 may allow exact positioning of the device under test, e.g. by rotary and/or linear stages.

A device may be arranged inside the test chamber for helping the user positioning the device under test 200, e.g. comprising lasers which indicate the location where the device under test 200 is to be positioned.

The test chamber 5 is configured to be positioned on the ground. The surface of the test chamber 5 which stands on the ground defines horizontal planes parallel to this surface and the test chamber 5 therefore also defines a vertical axis perpendicular to the horizontal planes.

The testing system 100a further comprises at least one first antenna 2-1 to 2-n and at least one reflector 3-1 to 3-n arranged inside the test chamber 5. There is exactly one reflector 3-1 to 3-n corresponding to each first antenna 2-1 to 2-n and spaced from the corresponding first antenna 2-1 to 2-n. The invention is not restricted to any particular number n of first antennas 2-1 to 2-n and corresponding reflectors 3-1 to 3-n. For example, there may be only one pair, two pairs, three pairs, four pairs or more than four pairs of a first antenna 2-1 to 2-n and a corresponding reflector 3-1 to 3-n.

Each reflector 3-1 to 3-n is mounted on a respective reflector mount 9-1 to 9-n. The reflector mount 9-1 to 9-n may be fixed on a wall of the test chamber 5.

The first antenna 2-1 to 2-n may transmit an electromagnetic signal in an active measurement mode to the device under test 200. In a passive measurement mode, the first antenna 2-1 to 2-n receives an electromagnetic signal from the device under test 200. The first antennas 2-1 to 2-n are configured for an indirect far-field (FF) measurement, i.e. the beam path does not extend directly from the first antennas 2-1 to 2-n to the device under test 200 but rather there is an indirect beam path which extends between each first antenna 2-1 to 2-n and the device under test 200 via the corresponding reflector 3-1 to 3-n.

The testing system 100a further comprises at least one second antenna 4 configured to transmit and/or receive an electromagnetic signal along a direct beam path extending between said at least one second antenna 4 and the device under test 200. The at least one second antenna 4 is therefore configured for direct FF measurements of the device under test 200. The invention is again not restricted to a particular number of second antennas 4.

The at least one first antenna 2-1 to 2-n and the corresponding reflector 3-1 to 3-n are arranged such that a quiet zone 300 is provided at the test location 400. The quiet zone 300 comprises preferably a location where the antennas of the device under test 200 are located.

The at least one reflector 3-1 to 3-n can be rotated in a horizontal plane defined by the test chamber 5, i.e. around a vertical axis which can be an axis through a center of the body of the reflector 3-1 to 3-n. By rotating the at least one reflector 3-1 to 3-n, the position of the quiet zone 300 changes. For devices under test 200 with different antenna configurations, the at least one reflector 3-1 to 3-n can be rotated such that the quiet zone 300 always comprises the location of the antennas of the device under test 200. The quiet zone 300 also corresponds to the region where the at least one first antenna 2-1 to 2-n transmits the electromagnetic signals or to the region where the electromagnetic signals received by the at least one first antenna 2-1 to 2-n originate.

The testing system 100a further comprises a signal generator 6 which can generate a signal of any desired form, e.g. a modulated signal, to be transmitted by the at least one first antenna 2-1 to 2-n and/or by the at least one second antenna 4.

Moreover, the testing system 100a comprises a signal analyzer 7 for analyzing a signal generated based on electromagnetic signals received by the at least one first antenna 2-1 to 2-n and/or at least one second antenna 4.

The signal analyzer 7 may comprise a vector network analyzer or a spectrum analyzer. The signal analyzer 7 may be configured to generate 3D measurements of signal characteristics of the device under test 200. The signal analyzer 7 may determine over-the-air (OTA) characteristics of the device under test 200.

The signal generator 6 and the signal analyzer 7 can be devices external to the test chamber which may be connected by respective cables to a device comprising the test chamber 5.

In further embodiments, the testing system 100a may also comprise a device for adjusting a temperature within the test chamber 5. The device under test 200 can be tested at different temperatures, e.g. in a range between −20° C. to 85° C.

In further embodiments, the testing system 100a can be calibrated using a calibration antenna, e.g. a horn calibration antenna. The calibration antenna is located in place of the device under test 200 for calibrating the testing system 100a, i.e. in the test location 400.

Figure 2:
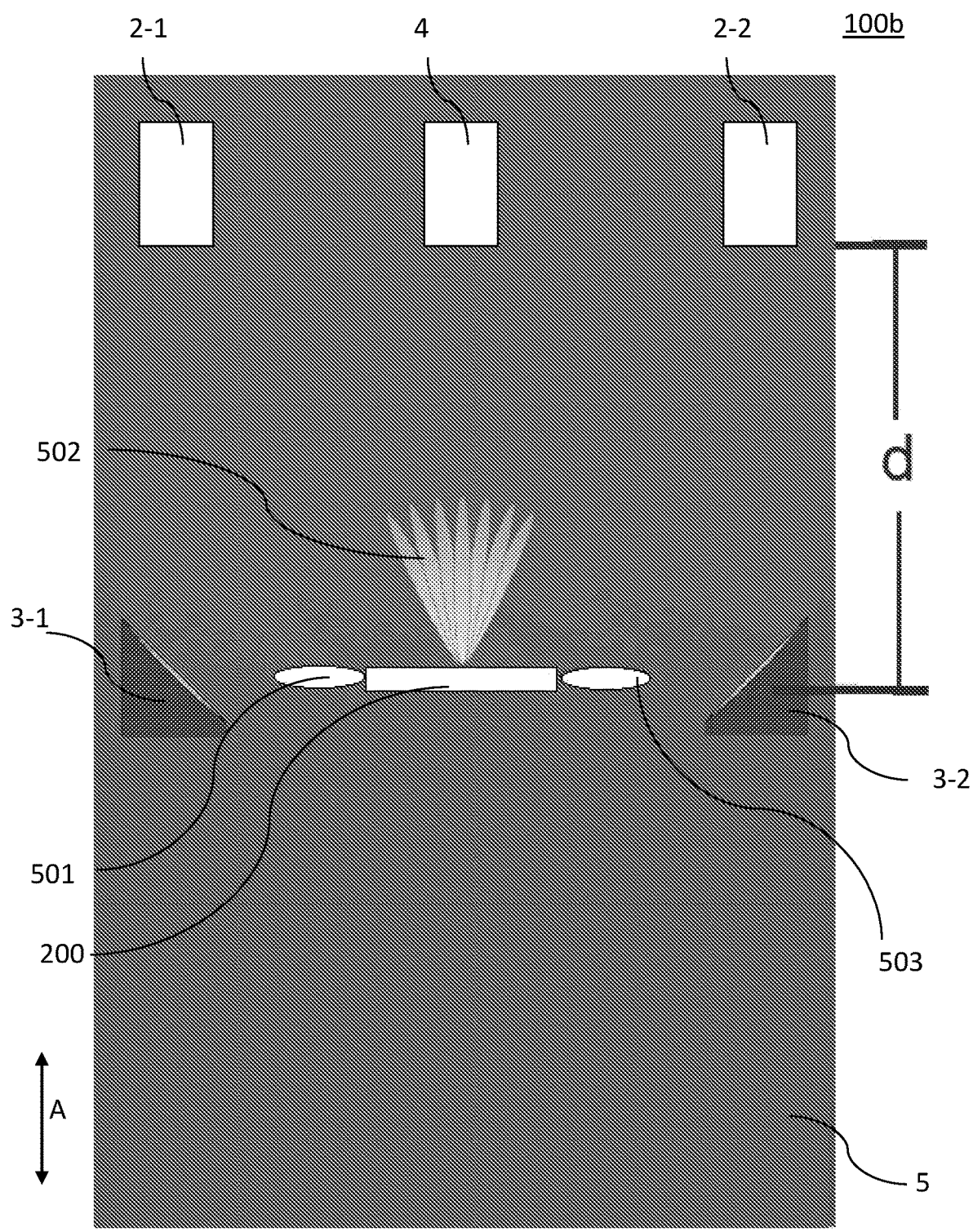
FIG. 2 shows a schematic illustration of a testing system according to an embodiment of the invention.

FIG. 2 shows a schematic illustration of another testing system 100b. According to this embodiment, there are two first antennas 2-1, 2-2 with corresponding reflectors 3-1, 3-2 and one second antenna 4, although the invention is not restricted to these numbers of antennas 3-1, 3-2, 4.

Each first antenna 2-1, 2-2 is arranged parallel to a vertical axis A above a respective reflector 3-1, 3-2. The first antennas 2-1, 2-2 can receive electromagnetic signals 501, 503 emitted by antennas arranged at a respective left and right side region of the device under test 200. The second antenna 4 essentially receives electromagnetic signals 502 emitted parallel to the vertical axis A, e.g. by antennas in a front or back region of the device under test 200. The distance d between the first antennas 2-1, 2-2 and the corresponding reflectors 3-1, 3-2 is such that the first antennas 2-1, 2-2 measure a far-field characteristic of the device under test 200.

Figure 3:
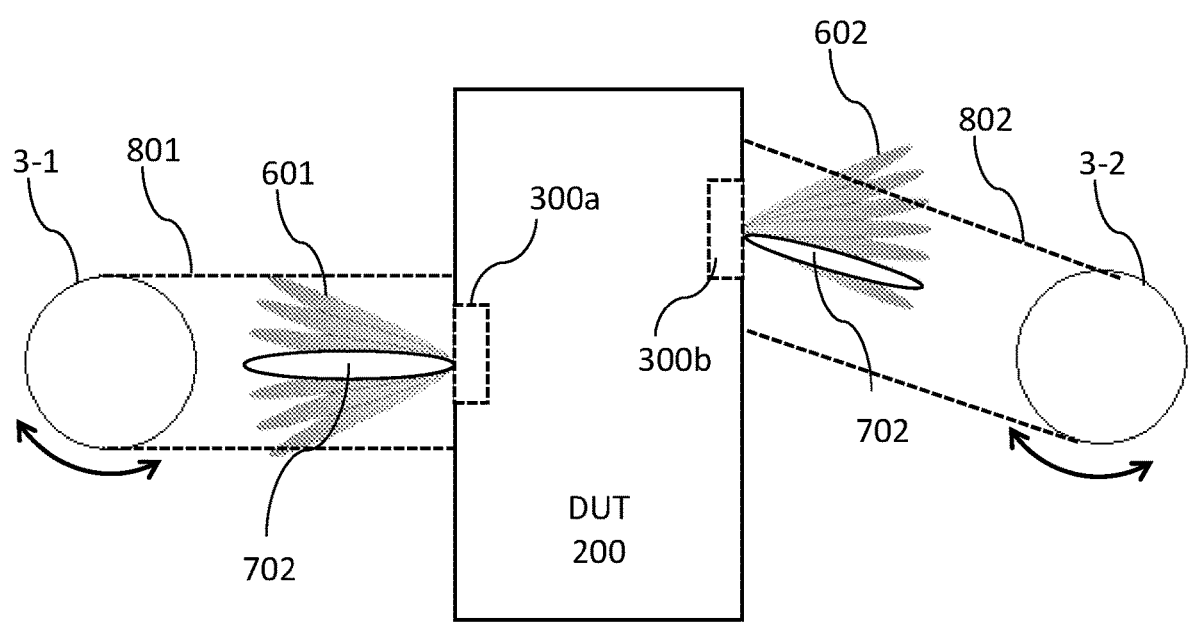
FIG. 3 shows a schematic illustration of different antenna locations of a device under test.

FIG. 3 shows a schematic illustration of different antenna locations of a device under test 200. For example, a device under test 200 may have antennas in a left side region and a right region. By rotating respective reflectors 3-1, 3-2 in the left region and right region, respectively, a section 801, 802 of a corresponding beam path can be adjusted such that respective quiet zones 300a and 300b are generated which include the antennas of the device under test 200 in the left region and right region, respectively.

Moreover, the antennas of the device under test 200 may comprise a plurality of antennas for generating a plurality of beams 601, 602. The respective beam 701, 702, identified by a beam identification number (ID), oriented towards the reflector 3-1, 3-2 is identified based on the rotation angle of the reflector 3-1, 3-2.

Whereas a single device under test 200 is illustrated in FIG. 3, the concept is also applicable to different devices under test 200 having antennas at different locations.

Figure 4:
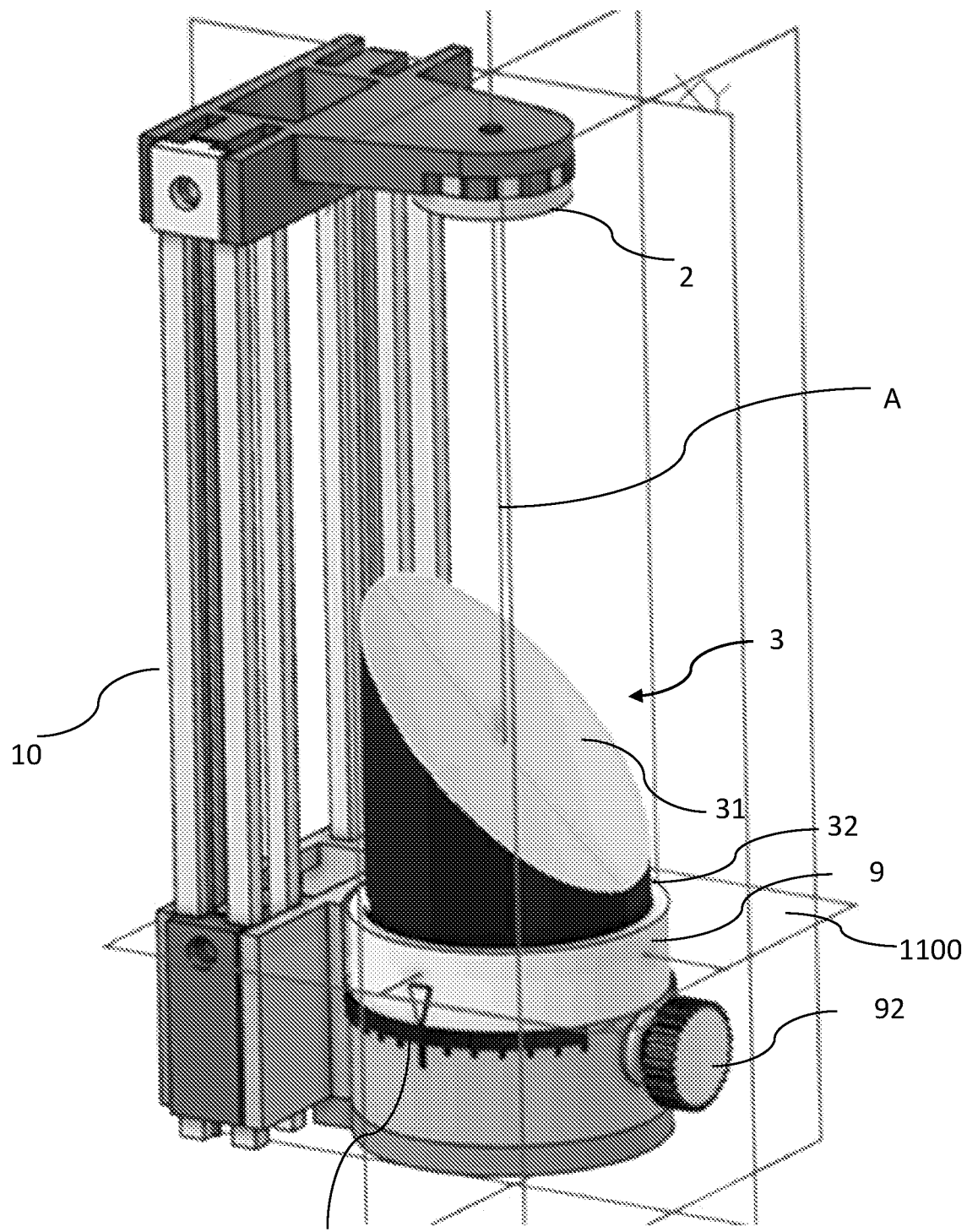
FIG. 4 shows a schematic illustration of part of a testing system according to an embodiment of the invention.

FIG. 4 shows a schematic illustration of a part of a testing system 100c. The reflector 3 comprises a concave parabolic mirror surface 31. The mirror surface 31 may be coated to improve the reflection properties of the reflector 3. For example, the mirror surface 31 may be coated with gold and a dielectric coating for hardness.

The reflector 3 further comprises a body portion 32 which is arranged on a reflector mount 9. The body portion can be made at least partly of aluminium. The reflector mount 9 comprises a rotary knob 92 and a scale 91. By manually operating the rotary knob 92, the user can adjust the rotation angle of the reflector 3 in the horizontal plane 1200, i.e. around a vertical axis A. The first antenna 2 and the reflector mount 9 are connected to a mounting device 10 which may have an adjustable elevation arm, i.e. having a variable height.

Figure 5:
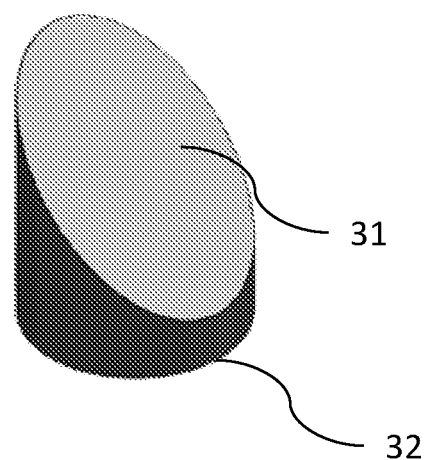
FIG. 5 shows a schematic oblique view of a reflector of the testing system according to an embodiment of the invention.

FIG. 5 shows a schematic oblique view of the reflector 3 of the testing system 100a to 100c which can be used in any of the above embodiments.

Figure 6:
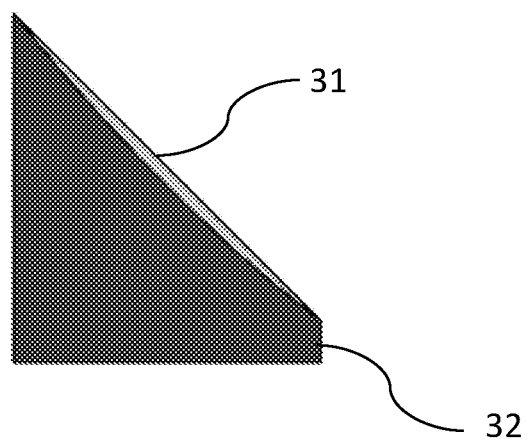
FIG. 6 shows a schematic side view of the reflector illustrated in FIG. 5.

FIG. 6 shows a schematic side view of the reflector 3 illustrated in FIG. 5.

Figure 7:
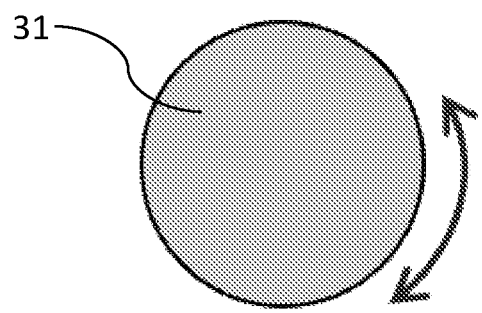
FIG. 7 shows a schematic top view of the reflector illustrated in FIGS. 5 and 6.

FIG. 7 shows a schematic top view of the reflector 3 illustrated in FIGS. 5 and 6.

Figure 8:
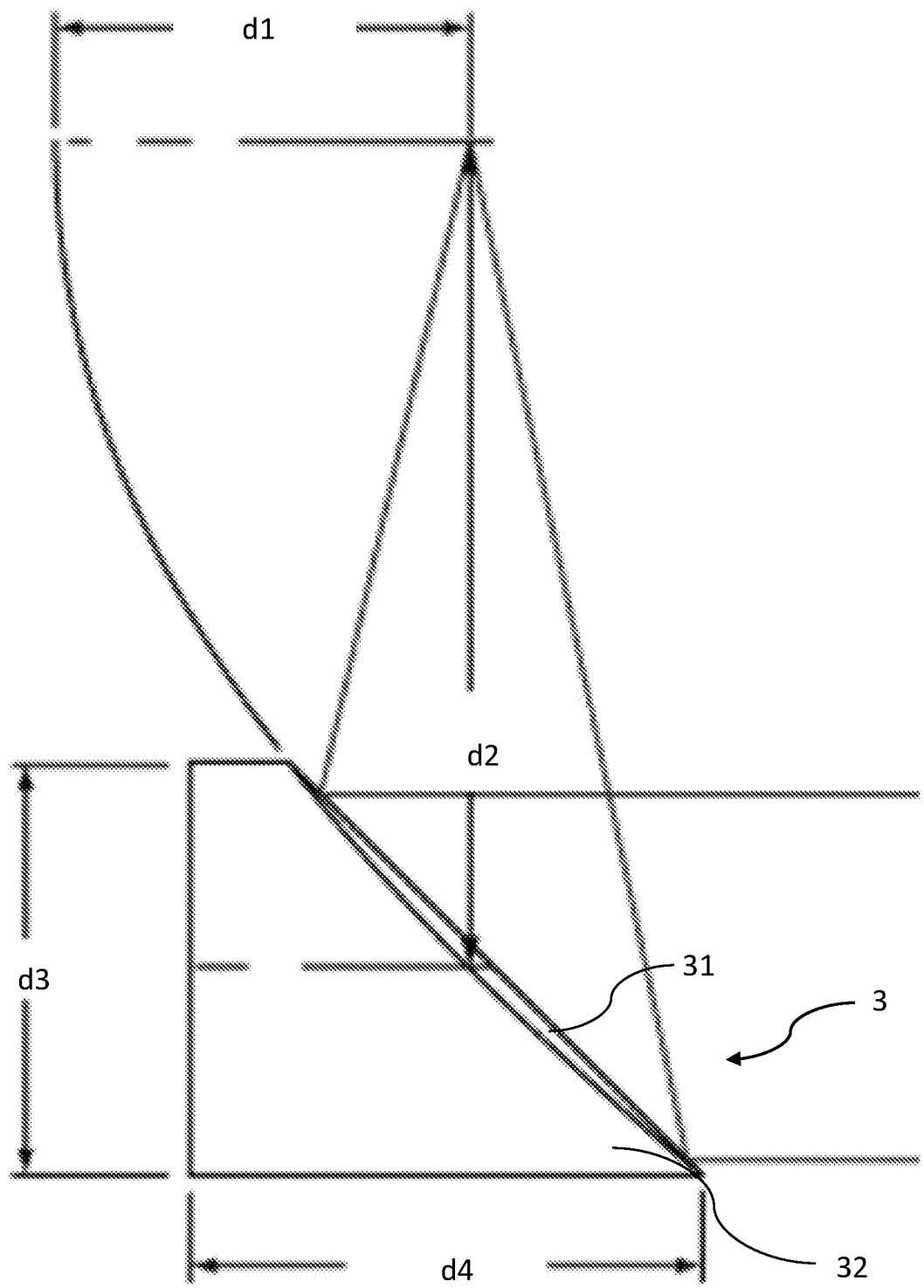
FIG. 8 shows a schematic side view illustrating optical properties of the reflector illustrated in FIGS. 5 to 7.

FIG. 8 shows a schematic side view illustrating the optical properties of the reflector 3 illustrated in FIGS. 5 to 7. The reflector 3 is characterized by a parental focal length d1, a reflected focal length d2, a diameter d3 and a thickness d4.

Figure 9:
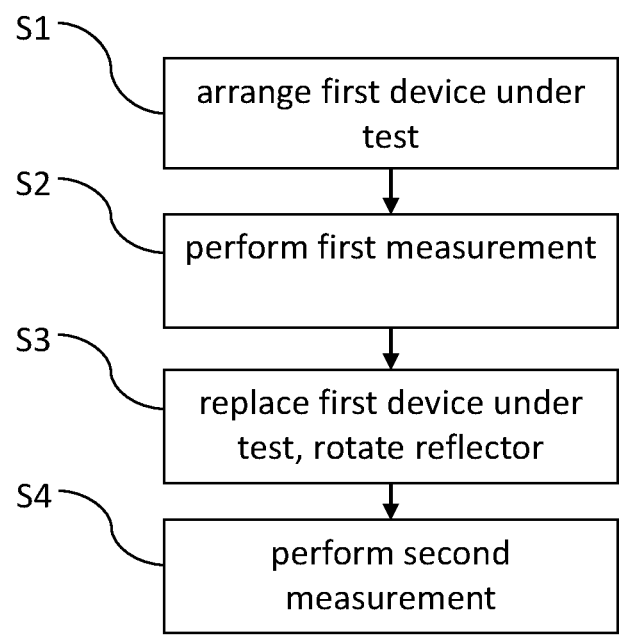
FIG. 9 shows a flow diagram illustrating a method for testing devices under test according to an embodiment of the invention.

FIG. 9 shows a flow diagram illustrating a method for testing devices under test 200. The method can be performed using any of the above-described testing systems 100a to 100c. In turn, each of the above-described testing systems 100a to 100c may be configured to carry out the method described in the following.

In a first step S1, a first device under test 200 is arranged at the test location 400 of the testing system 100a to 100c.

In a second step S2, a first measurement is performed on the first device under test 200. The device under test 200 can be an active device or a passive device. The first measurement may comprise emitting electromagnetic signals by the at least one first antenna 2, 2-1 to 2-n and/or the at least one second antenna 4 towards the device under test 200. The emitted electromagnetic signal may be swept over a predefined frequency range, e.g. 26.5 GHz to 40 GHz.

The first measurement may in addition or alternatively comprise the reception of electromagnetic signals from the device under test 200 by the at least one first antenna 2, 2-1 to 2-n and/or the at least one second antenna 4. In particular, a frequency response of the device under test 200 may be measured.

The first measurement may comprise a passive antenna measurements, e.g. measuring a magnitude and/or phase of signal received from the first device under test 200.

The first measurement may also comprise an active antenna measurement, e.g. a measurement of a total radiated power (TRP), effective isotropic radiated power (EIRP), total isotropic sensitivity (TIS), effective isotropic sensitivity (EIS), error vector magnitude (EVM), and the like.

The first measurement may also comprise a directivity, a gain, a realized gain, an efficiency and/or a beamwidth of the received signal.

In a third step S3, the first device under test 200 is dismounted and replaced by a second device under test 200. The at least one reflector 3, 3-1 to 3-n is rotated to bring the at least one reflector 3, 3-1 to 3-n into a new orientation. Each reflector 3, 3-1 to 3-n may be rotated separately or all the reflector 3, 3-1 to 3-n may be rotated simultaneously.

The location and/or orientation of the antennas of the first device under test 200 may differ from the location and/or orientation of the antennas of the second device under test 200. By rotating the at least one reflector 3, 3-1 to 3-n, a quiet zone 300, 300a, 300b can always be provided at the location of the antennas of the respective device under test 200.

In a fourth step S4, a second measurement is performed on the second device under test 200. The second measurement may comprise any of the measurements described above in the context of the first measurement. The type of the second measurement may be identical to or different from the type of the first measurement.

Summarizing, the invention relates to a testing system 100a to 100c and a corresponding testing method, where a reflector 3, 3-1 to 3-n is horizontally rotatable, i.e. around a vertical axis. In this way, the testing system can be adjusted to devices under test with different antenna arrangements.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

The invention claimed is:

1. A testing system for testing a device under test, comprising:
    a test chamber, comprising a test location for receiving the device under test;
    at least one first antenna with a corresponding reflector, wherein the at least one first antenna is configured to transmit and/or receive an electromagnetic signal along an indirect beam path, wherein the indirect beam path extends between said at least one first antenna and the device under test via the corresponding reflector; and
    at least one second antenna configured to transmit and/or receive an electromagnetic signal along a direct beam path extending between said at least one second antenna and the device under test;
    wherein the at least one first antenna and the corresponding reflector are arranged to provide a quiet zone at the test location; and
    wherein the at least one reflector is configured to be rotated horizontally.

2. The testing system according to claim 1, wherein the at least one reflector comprises a surface with a parabolic shape.

3. The testing system according to claim 1, wherein the testing system is configured to test a device under test having a plurality of antennas, wherein the first antennas and the plurality of antennas of the device under test are in a one-to-one correspondence.

4. The testing system according to claim 1, wherein a surface roughness of a reflecting surface of the at least one reflector is smaller than 10 nanometers.

5. The testing system according to claim 1, wherein the at least one reflector has rolled and/or serrated edges.

6. The testing system according to claim 1 wherein the at least one first antenna and the corresponding reflector are located with respect to the test location in such a way that said first antenna is configured to transmit the electromagnetic signal to and/or receive the electromagnetic signal from an antenna of the device under test in a side region of the device under test.

7. The testing system according to claim 1, further comprising a signal analyzer configured to determine a beam of a plurality of beams of the device under test based on a rotation angle of the at least one reflector.

8. The testing system according to claim 1, wherein the at least one reflector is configured to be rotated manually or automatically, in particular with a motor of a measurement system.

9. The testing system according to claim 1, wherein a phase center of the at least one first antenna is located at a focal point of the corresponding reflector.

10. The testing system according to claim 1, further comprising at least one reflector mount for mounting the at least one reflector, wherein the reflector mount is attached to a chamber wall of the test chamber.

11. The testing system according to claim 1, wherein the at least one first antenna and the at least one second antenna are arranged in a same plane.

12. The testing system according to claim 1, wherein propagation angles of the at least one first antenna and the at least one second antenna are substantially identical.

13. The testing system according to claim 1, wherein, by rotating the at least one reflector, the quiet zone is brought from a first region of the test location to a second region of the test location.

14. The testing system according to claim 1, further comprising a device under test mount for receiving the device under test in a fixed position.

15. A method for testing devices under test, comprising the steps:
    arranging a first device under test at the test location of the testing system according to one of the preceding claims;
    performing a first measurement on the first device under test;
    replacing the first device under test by a second device under test, wherein the at least one reflector is rotated to bring the at least one reflector into a new orientation; and
    performing a second measurement on the second device under test.

* * * * *